United States Patent
Rofougaran

(10) Patent No.: US 7,702,345 B2
(45) Date of Patent: Apr. 20, 2010

(54) VOICE DATA RF DISK DRIVE IC

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 521 days.

(21) Appl. No.: 11/715,652

(22) Filed: Mar. 8, 2007

(65) Prior Publication Data

US 2008/0146260 A1 Jun. 19, 2008

Related U.S. Application Data

(63) Continuation-in-part of application No. 11/641,999, filed on Dec. 19, 2006.

(51) Int. Cl.
H04B 7/00 (2006.01)
H04Q 7/20 (2006.01)

(52) U.S. Cl. .................... 455/511; 455/550.1; 455/333; 455/313

(58) Field of Classification Search .............. 455/552.1, 455/275, 323, 511, 118, 75, 73, 86, 90.2, 455/77, 558, 557, 333, 88, 68, 550.1, 71, 455/313; 375/260, 222, 219, 261
See application file for complete search history.

(56) References Cited

U.S. PATENT DOCUMENTS

2004/0266385 A1* 12/2004 Uchitomi et al. ............ 455/333
2006/0022861 A1* 2/2006 Kudoh et al. ................ 341/155
2006/0148416 A1* 7/2006 Harasawa et al. ............. 455/71
2007/0123314 A1* 5/2007 Ragan ........................ 455/572
2007/0176640 A1* 8/2007 Sasagawa .................... 326/97
2008/0012650 A1* 1/2008 Shinbo et al. ................. 331/17

FOREIGN PATENT DOCUMENTS

EP  1335544 A2  8/2003
EP  1727291 A2  11/2006
KR  20060066021  6/2006

OTHER PUBLICATIONS

GSM "LoCosto", Texas Instruments, Technology for Innovators, pp. 1-2.
Edge/GPRS/GSM Single-Chip Multimedia Baseband Processor, BCM2133, Product Brief, Broadcom Corporation, 2133-PB07-D1, Nov. 30, 2006, pp. 1-2.
WCDMA Baseband Coprocessor, BCM2141, Product Brief, Broadcom Corporation, 2141-PB03-R, Dec. 1, 2006, pp. 1-2.

(Continued)

*Primary Examiner*—Sujatha Sharma
(74) *Attorney, Agent, or Firm*—Garlick Harrison & Markison; Timothy W. Markison

(57) ABSTRACT

An integrated circuit (IC) includes a baseband processing module, a disk driver interface, an RF section, and an interface module. The disk drive interface is coupled to the baseband processing module and to an off-IC disk drive, wherein the disk driver interface facilitates transfers between the baseband processing module and the off-IC disk drive.

24 Claims, 5 Drawing Sheets

OTHER PUBLICATIONS

Hedge Single-Chip Multimedia Baseband Processor, BCM2152, Product Brief, Broadcom Corporation, 2152-PB04-R, Dec. 1, 2006, pp. 1-2.

Andrew Fogg: DigRF Baseband/RF Digital Interface Specification; Logical, Electrical and Timing Characteristics, EGPRS Version, Digital Interface Working Group, version 1.12, pp. 1-32.

Molecular Expressions Optical Microscopy Primer: Digital Imaging in Optical Microscopy, pp. 1-13.

Samsung Unveils The World's First 8Gb Hard Disk Embedded Phone—The i1310, Press Release, pp. 1-2.

* cited by examiner

VOICE DATA RF DISK DRIVE IC

This patent application is claiming priority under 35 USC §120 as a continuation-in-part patent application of patent application entitled VOICE/DATA/RF INTEGRATED CIRCUIT, having a filing date of Dec. 19, 2006, and a Ser. No. 11/641,999.

CROSS REFERENCE TO RELATED PATENTS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless communication systems and more particularly to integrated circuits of transceivers operating within such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have a constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is 8-PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

As yet another example, if the data modulation scheme is x-QAM (16, 64, 128, 256 quadrature amplitude modulation), the data modulation stage functions to convert digital words into Cartesian coordinate symbols (e.g., having an in-phase signal component and a quadrature signal component). The IF stage includes mixers that mix the in-phase signal component with an in-phase local oscillation and mix the quadrature signal component with a quadrature local oscillation to produce two mixed signals. The mixed signals are summed together and filtered to produce an RF signal that is subsequently amplified by a power amplifier.

As the desire for wireless communication devices to support multiple standards continues, recent trends include the desire to integrate more functions on to a single chip. Such additional functions require additional memory to store the algorithms, data, and/or files associated with the additional functions. One type of additional memory is a mini disk drive that is capable of storing Giga-bytes of information. However, such desires have gone unrealized when it comes to implementing baseband and RF on the same chip for multiple wireless communication standards, which may further include a disk drive interface.

Therefore, a need exists for an integrated circuit (IC) that implements baseband and RF of multiple wireless communication standards on the same IC die with a disk drive interface.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
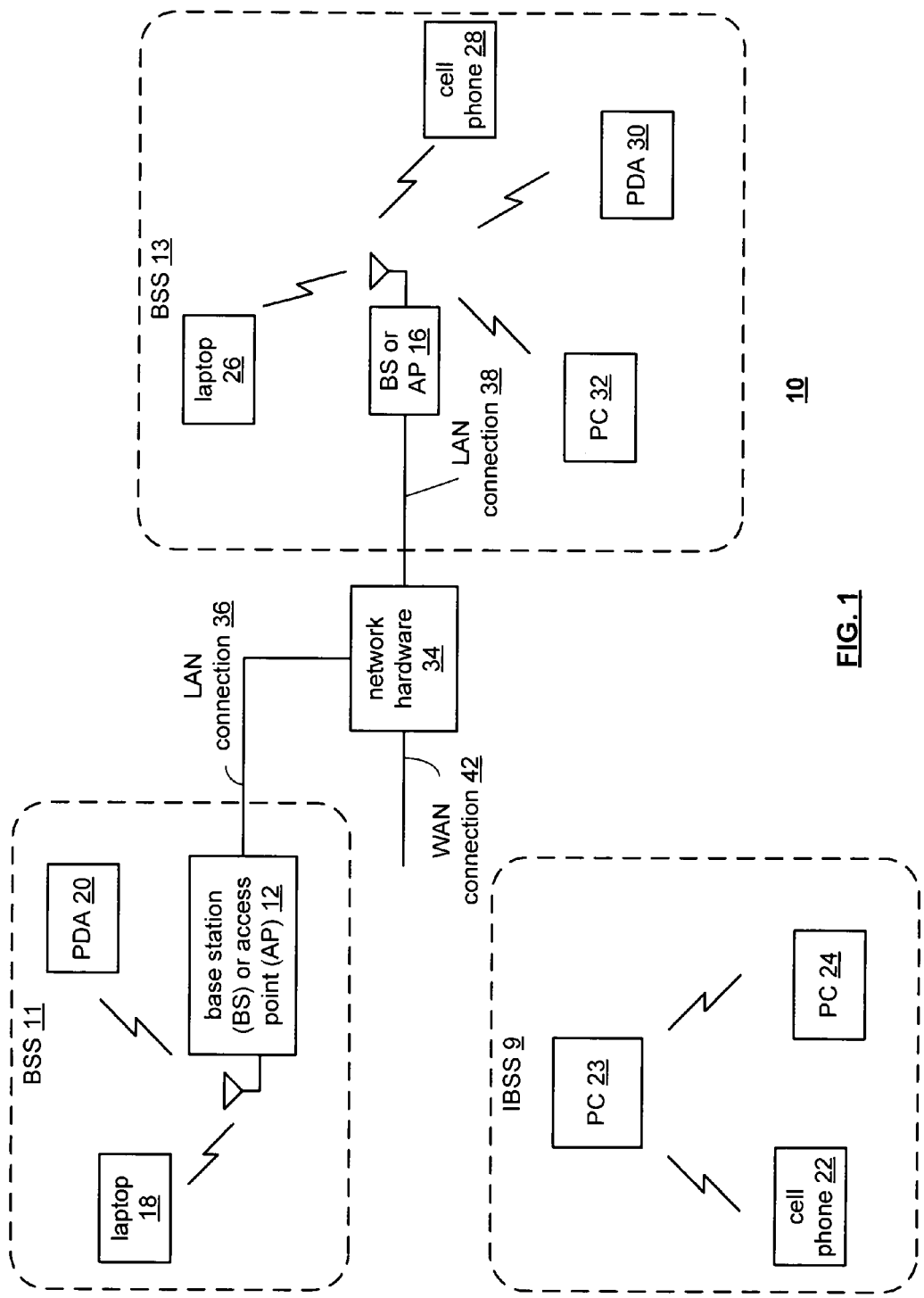
FIG. 1 is a schematic block diagram of an embodiment of a wireless communication system in accordance with the present invention.

FIG. 1 is a schematic block diagram of a wireless communication environment that includes a communication device 10 communicating with one or more of a wireline non-real-time device 12, a wireline real-time device 14, a wireline non-real-time and/or real-time device 16, a base station 18, a wireless non-real-time device 20, a wireless real-time device 22, and a wireless non-real-time and/or real-time device 24. The communication device 10, which may be a personal computer, laptop computer, personal entertainment device, cellular telephone, personal digital assistant, a game console, a game controller, and/or any other type of device that communicates real-time and/or non-real-time signals, may be coupled to one or more of the wireline non-real-time device 12, the wireline real-time device 14, and the wireline non-real-time and/or real-time device 16 via a wireless connection 28. The wireless connection 28 may be an Ethernet connection, a universal serial bus (USB) connection, a parallel connection (e.g., RS232), a serial connection, a fire-wire connection, a digital subscriber loop (DSL) connection, and/or any other type of connection for conveying data.

The communication device 10 communicates RF non-real-time data 25 and/or RF real-time data 26 with one or more of the base station 18, the wireless non-real-time device 20, the wireless real-time device 22, and the wireless non-real-time and/or real-time device 24 via one or more channels in a frequency band ($fb_A$) that is designated for wireless communications. For example, the frequency band may be 900 MHz, 1800 MHz, 1900 MHz, 2100 MHz, 2.4 GHz, 5 GHz, any ISM (industrial, scientific, and medical) frequency bands, and/or any other unlicensed frequency band in the United States and/or other countries. As a particular example, wideband code division multiple access (WCDMA) utilizes an uplink frequency band of 1920-1980 MHz and a downlink frequency band of 2110-2170 MHz. As another particular example, EDGE, GSM and GPRS utilize an uplink transmission frequency band of 890-915 MHz and a downlink transmission band of 935-960 MHz. As yet another particular example, IEEE 802.11 (g) utilizes a frequency band of 2.4 GHz frequency band.

The wireless real-time device 22 and the wireline real-time device 14 communicate real-time data that, if interrupted, would result in a noticeable adverse affect. For example, real-time data may include, but is not limited to, voice data, audio data, and/or streaming video data. Note that each of the real-time devices 14 and 22 may be a personal computer, laptop computer, personal digital assistant, a cellular telephone, a cable set-top box, a satellite set-top box, a game console, a wireless local area network (WLAN) transceiver, a Bluetooth transceiver, a frequency modulation (FM) tuner, a broadcast television tuner, a digital camcorder, and/or any other device that has a wireline and/or wireless interface for conveying real-time data with another device.

The wireless non-real-time device 20 and the wireline non-real-time device 12 communicate non-real-time data that, if interrupted, would not generally result in a noticeable adverse affect. For example, non-real-time data may include, but is not limited to, text messages, still video images, graphics, control data, emails, and/or web browsing. Note that each of the non-real-time devices 14 and 22 may be a personal computer, laptop computer, personal digital assistant, a cellular telephone, a cable set-top box, a satellite set-top box, a game console, a global positioning satellite (GPS) receiver, a wireless local area network (WLAN) transceiver, a Bluetooth transceiver, a frequency modulation (FM) tuner, a broadcast television tuner, a digital camcorder, and/or any other device that has a wireline and/or wireless interface for conveying real-time data with another device.

Depending on the real-time and non-real-time devices coupled to the communication unit 10, the communication unit 10 may participate in cellular voice communications, cellular data communications, video capture, video playback, audio capture, audio playback, image capture, image playback, voice over internet protocol (i.e., voice over IP), sending and/or receiving emails, web browsing, playing video games locally, playing video games via the internet, word processing generation and/or editing, spreadsheet generation and/or editing, database generation and/or editing, one-to-many communications, viewing broadcast television, receiving broadcast radio, cable broadcasts, and/or satellite broadcasts.

Figure 2:
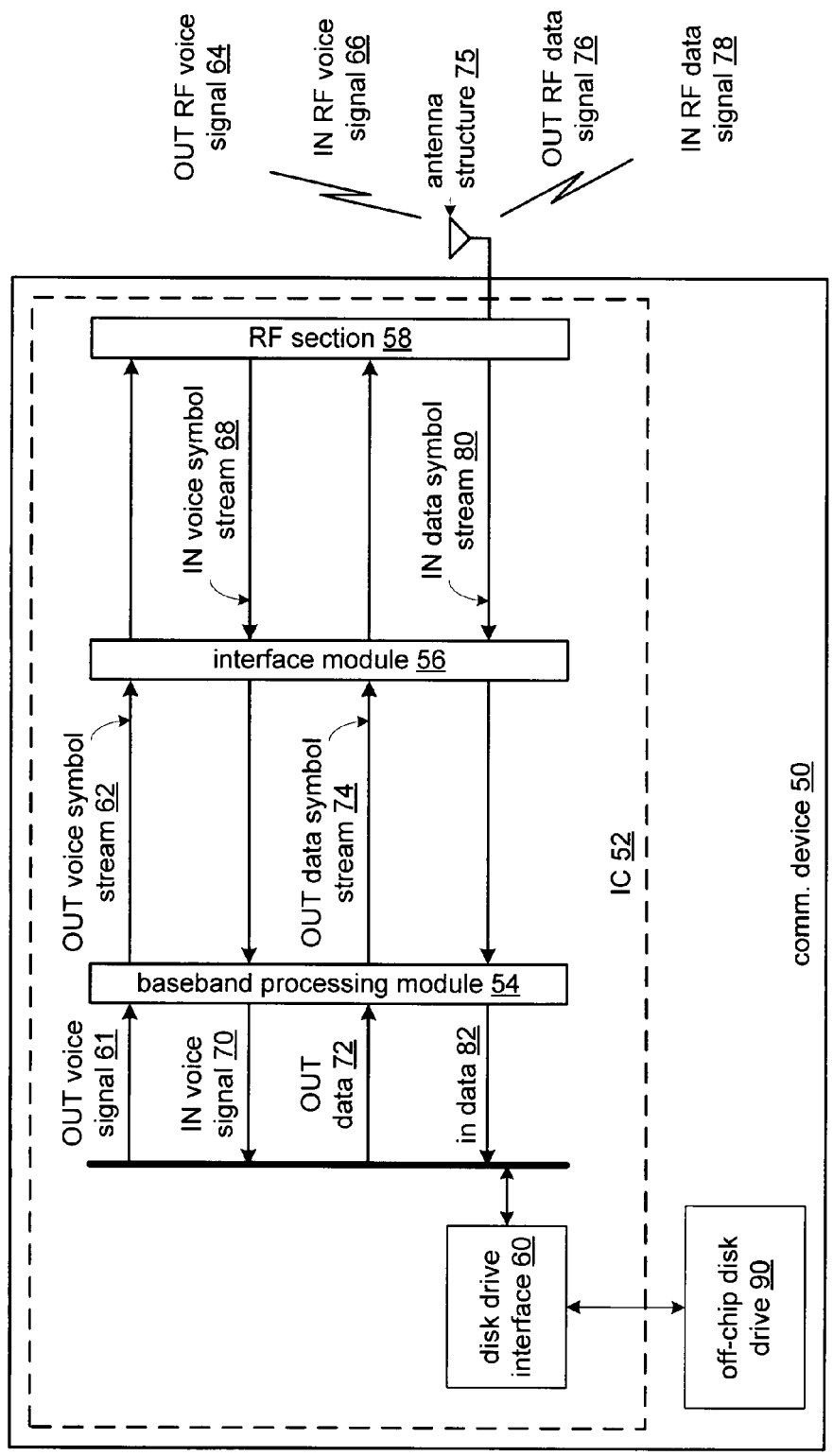
FIG. 2 is a schematic block diagram of an embodiment of a wireless communication device in accordance with the present invention.

FIG. 2 is a schematic block diagram of an embodiment of a wireless communication device 50 that includes an integrated circuit (IC) 52, an off-chip disk drive 90, and an antenna structure. The IC 52 includes a baseband processing module 54, an interface module 56, a radio frequency (RF) section 58, and a disk drive interface 60. Note that the communication device 50 may be one of the communication devices 18-32 of FIG. 1 or another type of wireless communication device.

The baseband processing module 54 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 54 may have an associated memory and/or memory element, which may be a single memory device, a plurality of memory devices, and/or embedded circuitry of the processing module 54. Such a memory device may be a read-only memory, random access memory, volatile memory, non-volatile memory, static memory, dynamic memory, flash memory, cache memory, and/or any device that stores digital information. Note that when the processing module 54 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module 54 executes, hard coded and/or operational instructions corresponding to at least some of the steps and/or functions illustrated in FIGS. 2-5.

The baseband processing module 54 is coupled to convert an outbound voice signal 61 into an outbound voice symbol stream 62 and to convert an inbound voice symbol stream 68 into an inbound voice signal 70 in accordance with one or more cellular voice communication standards (e.g., GSM, CDMA, WCDMA, AMPS, etc.). The baseband processing module 54 is also coupled to convert outbound data 72 into an outbound data symbol stream 74 and to convert an inbound data symbol stream 80 into inbound data 82 in accordance with one or more cellular data communication standards (e.g., EDGE, GPRS, etc.).

In this embodiment, the baseband processing module 54 may exchange the inbound data 82, the outbound data 72, the inbound voice signal 70, and/or the outbound voice signal 61 as data files, audio files, video files, image files, text messages, graphics files, and/or voice files with the off-chip disk drive 90. The off-chip disk drive 90, which may be a mini disk drive, is coupled to the IC 52 via the disk drive interface 60. The disk drive interface 60 may include a universal serial bus (USB) interface, an Ethernet based interface, a memory bridge circuit, and/or any other type of interface to couple the off-chip disk drive 90 to the IC 52. In one embodiment, the off-chip disk drive 90 is a hard disk drive and the disk drive interface 90 is a corresponding hard disk drive interface. In another embodiment, the off-chip disk drive is a memory card and the disk drive interface 60 is a corresponding memory card interface.

The RF section 58 (which may include a low noise amplifier module, a down conversion module, filtering module, an up-conversion module, and a power amplifier module) is coupled to convert an inbound RF voice signal 66 into the inbound voice symbol stream 68, convert the outbound voice symbol stream 62 into an outbound RF voice signal 64, convert an inbound RF data signal 78 into the inbound data symbol stream 80, and convert the outbound data symbol stream 74 into an outbound RF data signal 76.

The interface module 56, which may be implemented as described in co-pending patent application entitled VOICE/DATA/RF INTEGRATED CIRCUIT, having a filing date of Dec. 19, 2006, and a Ser. No. 11/641,999, is coupled to convey the inbound voice symbol stream 68 and the outbound voice symbol stream 62 between the baseband processing module 54 and the RF section 58; convey the inbound data symbol stream 80 and the outbound data symbol stream 74 between the baseband processing module 54 and the RF section 58; and convey the down converted GPS signals 92 from the RF section 58 to the GPS receiver 60.

Figure 3:
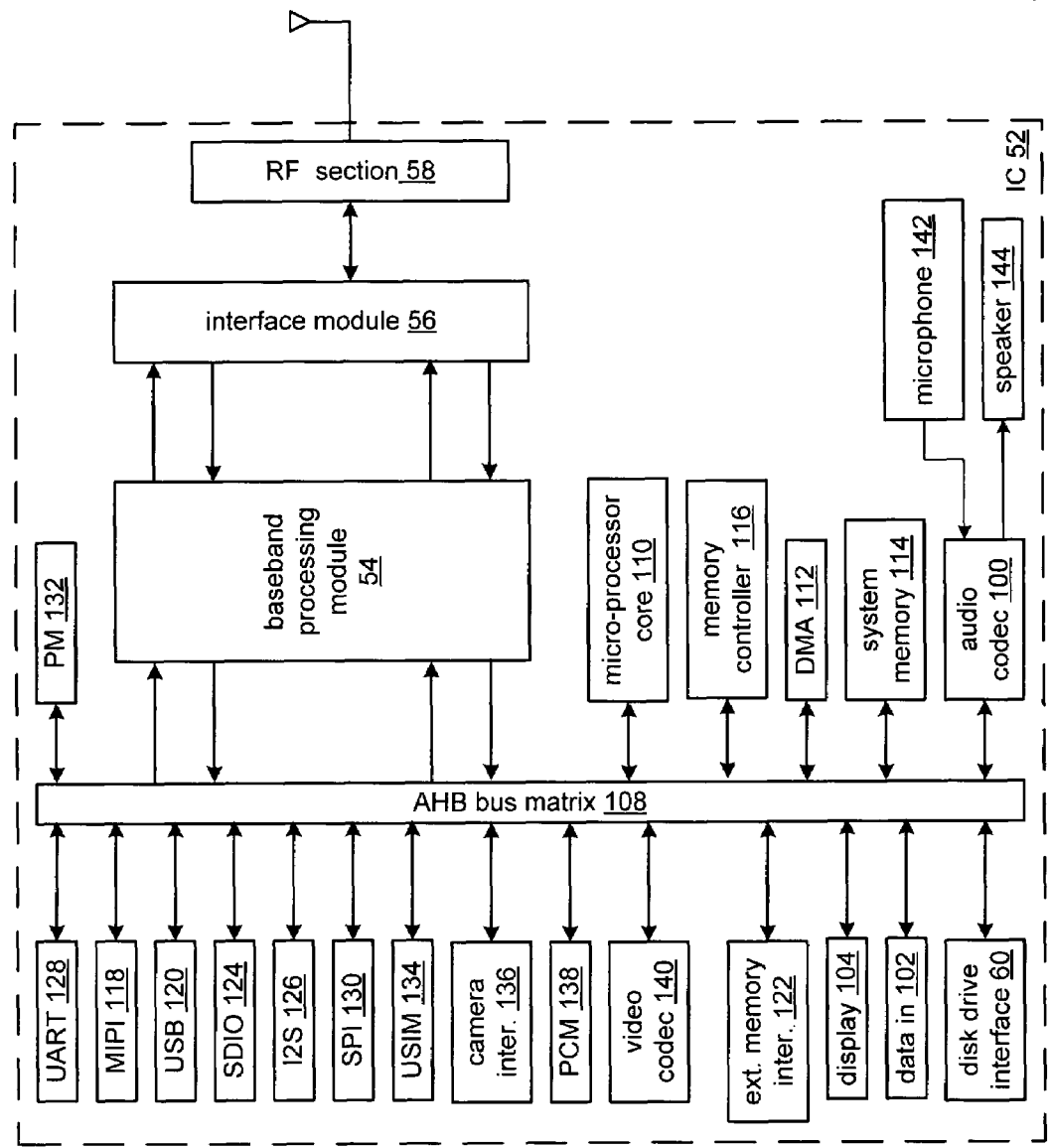
FIG. 3 is a schematic block diagram of an embodiment of an integrated circuit (IC) in accordance with the present invention.

FIG. 3 is a schematic block diagram of another embodiment of the integrated circuit 52 that includes the baseband processing module 54, the interface module 56, the RF section 58, the disk drive interface 60, and at least one of: an audio codec 100 coupled to convert an outbound analog voice signal into the outbound voice signal and to convert the inbound voice signal into an inbound analog voice signal; a data input interface 102 coupled to provide the outbound data to the baseband processing module 54; a display interface 104 coupled to provide the inbound data to an off-IC display device; a second data input interface 106 providing the outbound data to the display interface; an advanced high-performance (AHB) bus matrix 108 coupled to the baseband processing module 54; a microprocessor core 110 coupled to the AHB bus matrix 108; a mobile industry processor interface (MIPI) 112 coupled to the AHB bus matrix 108; a universal serial bus (USB) interface 120 coupled to the AHB bus matrix 108; an external memory interface 122 coupled to the AHB bus matrix 108; a secure digital input/output (SDIO) interface 124 coupled to the AHB bus matrix 108; an I2S interface 126 coupled to the AHB bus matrix 108; a Universal Asynchronous Receiver-Transmitter (UART) interface 128 coupled to the AHB bus matrix 108; a Serial Peripheral Interface (SPI) interface 130 coupled to the AHB bus matrix 108; a power management (PM) interface 132; a universal subscriber identity module (USIM) interface 134 coupled to the AHB bus matrix 108; a camera interface 136 coupled to the AHB bus matrix 108; a pulse code modulation (PCM) interface 138 coupled to the AHB bus matrix 108; a video codec 140 coupled to the AHB bus matrix 108; a direct memory access (DMA) module 112, a memory controller 116, a microphone circuit 142, and a speaker circuit 144.

In this embodiment, the IC 52 includes one or more of a plurality of interfaces that enable the communication device 50 to include one or more of a plurality of additional circuits. For example, the communication device 50 may be a cellular telephone that provides voice, data, and at least one other service via the IC 52, which may be a cellular telephone IC. An example of another service includes WLAN access via a WLAN transceiver to support voice over IP communications, internet access, etc. Another service example includes Bluetooth access via a Bluetooth transceiver to support a Bluetooth wireless headset, file transfers, and other piconet services.

For wireline connectivity to another device, the IC 52 may include a USB interface 120, an SPI interface 130, and I2S interface 126, and/or another other type of wired interface. In this instance, file transfers are easily supported by the wireline connectivity and can be managed by the processing module 54. Further, video games may be downloaded to the communication device 50 via the wireline connectivity and subsequently played under the control of the processing module 54. Alternatively, the wireline connectivity provides coupling to a game console such that the communication device 50 acts as the display and/or controller of the video game.

With the various interface options of the IC 52, the communication device 50 may function as a personal entertainment device to playback audio files, video files, image files, to record images, to record video, to record audio, to watch television, to track location, to listen to broadcast FM radio, etc. Such personal entertainment functions would be administered primarily by the processing module 54.

With the inclusion of one or more display interfaces 104 and 118, the communication device may include multiple displays, which may a liquid crystal (LCD) display, a plasma display, a digital light project (DLP) display, and/or any other type of portable video display. Note that the display interfaces 104 and/or 118 may be an LCD interface, a mobile industry processor interface (MIPI), and/or other type of interface for supporting the particular display.

The IC 52 may further include security interface options to protect the data stored in the communication device and/or to insure use of the communication device is by an authorized user. For example, the IC 52 may include the USIM interface 134 and/or the SDIO interface 124 for interfacing with a SIM card, a Secure Data card and/or a multi media card.

The system memory 114, the DMA controller 112, and/or the memory controller 116 coupled to the microprocessor core and/or to the baseband processing module 54 provide a Harvard architecture computer system that enables the communication device 50 to perform computer type functions (e.g., data processing, spreadsheets, calendar management, contact lists, etc.).

The microphone circuit block 142, which may include an interface to an off-chip microphone or an on-chip microphone transducer and biasing circuitry, is coupled to generate the outbound analog signal from received audio vibrations and to provide the outbound analog signals to the audio codec 100. The speaker circuit block 144, which may include an interface to an off-chip speaker or an on-chip speaker transducer and biasing circuitry, is coupled to render the inbound analog signal audible.

Figure 4:
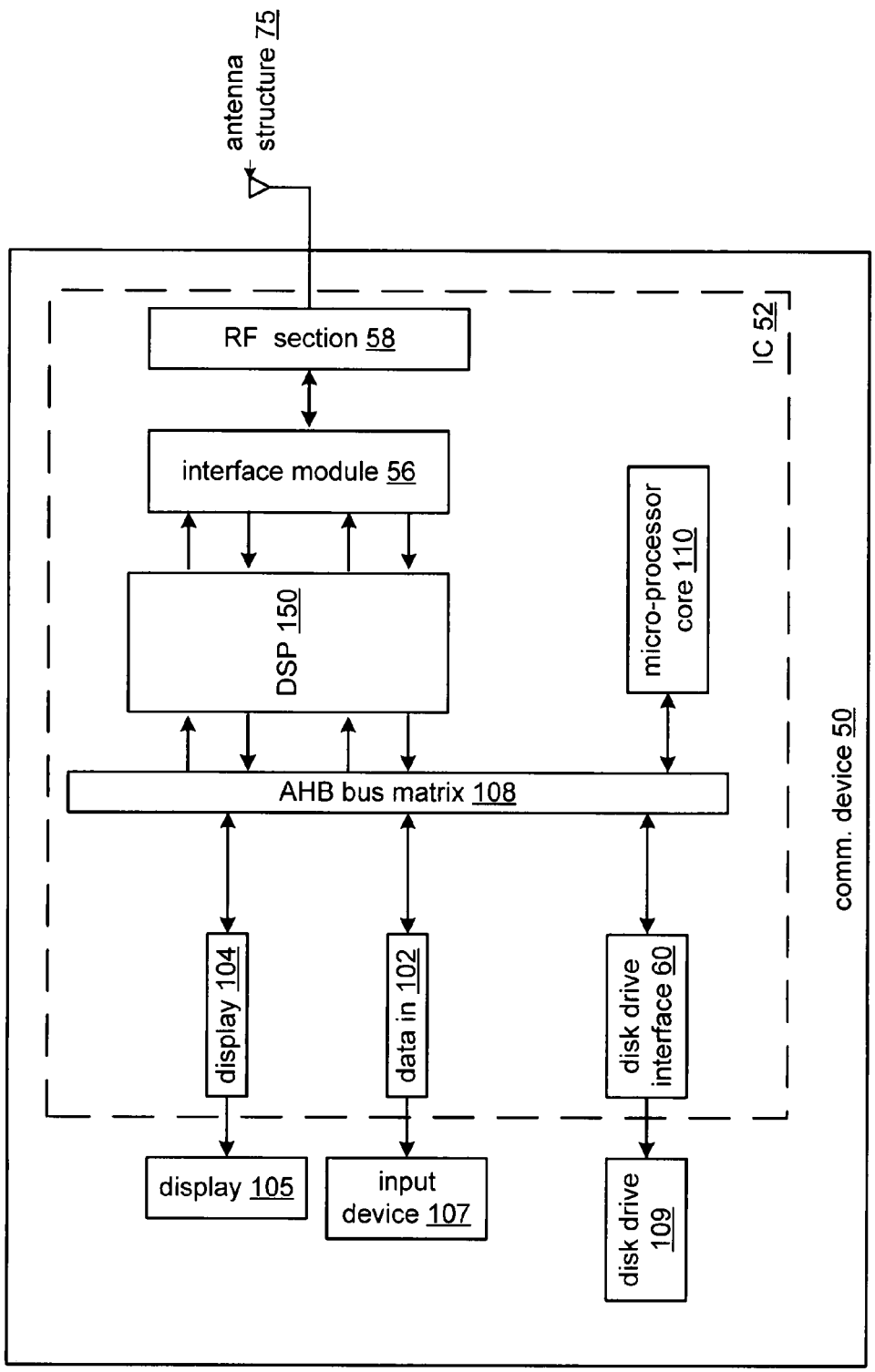
FIG. 4 is a schematic block diagram of another embodiment of a wireless communication device in accordance with the present invention.

FIG. 4 is a schematic block diagram of another embodiment of a wireless communication device 50 that includes an IC 52 and an antenna structure 75. In this embodiment, the IC 52 includes the microprocessor core 110, the AHB bus matrix 108, a digital signal processor 150, the interface module 56, the RF section 58, the display interface 104, the data input interface 102, and the disk drive interface 60.

The disk drive interface 60 is coupled to the AHB bus matrix and to an off-IC disk drive 109 to facilitate data transfers between the off-IC disk drive 109 and the digital signal processor 150 and/or the microprocessor core 110. Such data transfers may include data files, audio files, video files, image files, text messages, graphics files, and/or voice files. Note that the off-IC disk drive 109 may be a hard disk drive or a memory card.

The digital signal processing (DSP) module 150 is coupled to the AHB bus matrix 108 and to convert an outbound voice signal into an outbound voice symbol stream; to convert an inbound voice symbol stream into an inbound voice signal; to convert outbound data into an outbound data symbol stream; and to convert an inbound data symbol stream into inbound data.

The RF section 58 is coupled to the antenna structure 75 and to convert an inbound RF voice signal into the inbound voice symbol stream; to convert the outbound voice symbol stream into an outbound RF voice signal; to convert an inbound RF data signal into the inbound data symbol stream; and to convert the outbound data symbol stream into an outbound RF data signal.

The interface module 56 is coupled to convey the inbound voice symbol stream and the outbound voice symbol stream between the digital signal processing module and the RF section when the IC is in a voice mode and to convey the inbound data symbol stream and the outbound data symbol stream between the digital signal processing module and the RF section when the IC is in a data mode.

The data input interface 102 is coupled to the AHB bus matrix 108 and to an off-chip input device 105 such as a keypad, a keyboard, a touch screen, etc. In one embodiment, the data input interface 102 receives the outbound data from the off-chip input device and provides the outbound data to the DSP 150.

The display interface 104 is coupled to the AHB bus matrix 108 and to an off-chip display such as an LCD display, a DLP display, a plasma display, etc. In one embodiment, the display interface provides receives the inbound data from the DSP 150 and provides the inbound data to an off-IC display 107.

The IC 52 may further include an audio codec that is coupled to convert an outbound analog voice signal into the outbound voice signal and to convert the inbound voice signal into an inbound analog voice signal. The audio codec may receive the outbound analog voice signal from a microphone and may provide the inbound analog voice signal to a speaker.

The IC 52 may still further include one or more of a system memory, a direct memory access module; a memory controller coupled to the AHB bus; a mobile industry processor interface (MIPI) coupled to the AHB bus matrix; a universal serial bus (USB) interface coupled to the AHB bus matrix; an external memory interface coupled to the AHB bus matrix; a secure digital input/output (SDIO) interface coupled to the AHB bus matrix; an I2S interface coupled to the AHB bus matrix; a Universal Asynchronous Receiver-Transmitter (UART) interface coupled to the AHB bus matrix; a Serial Peripheral Interface (SPI) interface coupled to the AHB bus matrix; a power management interface; a universal subscriber identity module (USIM) interface coupled to the AHB bus matrix; a camera interface coupled to the AHB bus matrix; a pulse code modulation (PCM) interface coupled to the AHB bus matrix; and a video codec coupled to the AHB bus matrix.

Figure 5:
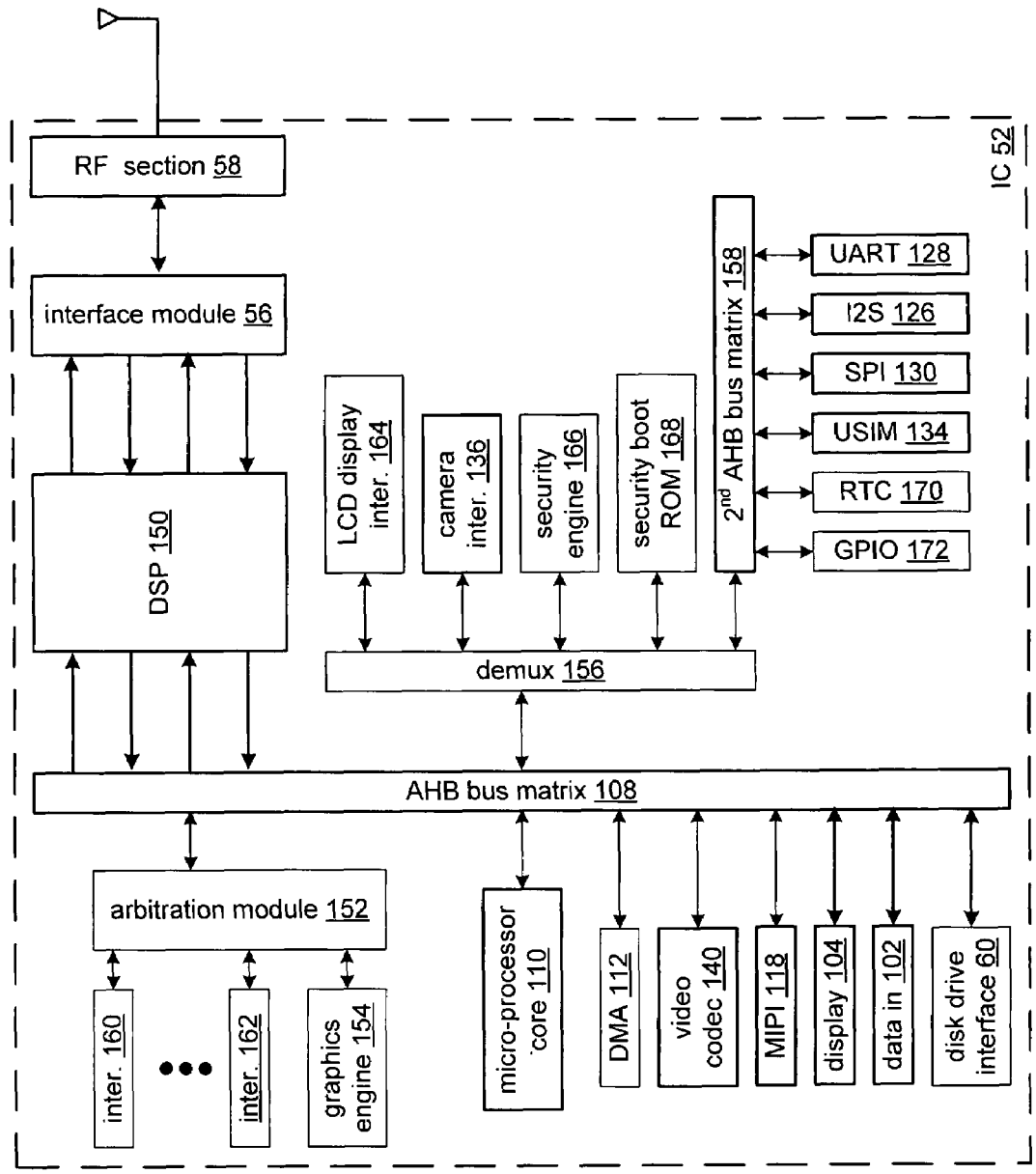
FIG. 5 is a schematic block diagram of another embodiment of an integrated circuit (IC) in accordance with the present invention.

FIG. 5 is a schematic block diagram of another embodiment of an integrated circuit (IC) 52 that includes the RF section 58, the interface module 56, the DSP 150, the disk drive interface 60, the AHB bus matrix 108, the microprocessor core 110, the data input interface 122, the display interface 144, the video codec 140, the mobile industry processor interface (MIPI) interface 118, an arbitration module 152, a direct memory access (DMA) 112, a graphics engine 154, a demultiplexer 156, a security engine 166, a security boot ROM 168, an LCD interface 164, a camera interface 136, a $2^{nd}$ AHB bus 158, a real time clock (RTC) module 170, a general purpose input/output (GPIO) interface 172, a Universal Asynchronous Receiver-Transmitter (UART) interface 128, a Serial Peripheral Interface (SPI) interface 130, and an I2S interface 126. The arbitration module 152 arbitrates access to the AHB bus 108 among a plurality of interface 106-162, which may include an SDIO interface, a universal serial bus (USB) interface, etc. and the graphics engine 154.

The graphics engine 154 is operable to generate two-dimensional and/or three-dimensional graphic images for display and/or for transmission as outbound data. In addition, the graphics engine 154 may process inbound data to produce two-dimensional and/or three-dimensional graphic images for display and/or storage.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. An integrated circuit (IC) comprises:
   a baseband processing module coupled to:
      convert an outbound voice signal into an outbound voice symbol stream;
      convert an inbound voice symbol stream into an inbound voice signal;
      convert outbound data into an outbound data symbol stream; and
      convert an inbound data symbol stream into inbound data;
   a disk drive interface coupled to the baseband processing module and to an off-IC disk drive, wherein the disk driver interface facilitates transfers between the baseband processing module and the off-IC disk drive;
   a radio frequency (RF) section coupled to:
      convert an inbound RF voice signal into the inbound voice symbol stream;
      convert the outbound voice symbol stream into an outbound RF voice signal;
      convert an inbound RF data signal into the inbound data symbol stream; and
      convert the outbound data symbol stream into an outbound RF data signal;
   an interface module coupled to:
      convey the inbound voice symbol stream and the outbound voice symbol stream between the baseband processing module and the RF section; and
      convey the inbound data symbol stream and the outbound data symbol stream between the baseband processing module and the RF section.

2. The IC of claim 1, wherein the disk drive interface comprises at least one of:
   a hard disk drive interface to interface with a hard disk drive; and
   a memory card interface to interface with a memory card.

3. The IC of claim 1, wherein the data transfers between the baseband processing module and the off-IC disk drive comprise at least one of:
   the inbound data;
   the inbound voice signal;
   the outbound voice signal;
   the outbound data;
   a video file;
   an audio file;
   an image file;
   a text message; and
   a graphics file.

4. The IC of claim 1 further comprises:
   an audio codec coupled to convert an outbound analog voice signal into the outbound voice signal and to convert the inbound voice signal into an inbound analog voice signal;
   a display interface coupled to provide the inbound data to an off-IC display device; and
   a data input interface coupled to provide the outbound data to at least one of the data baseband processing module and the display interface.

5. The IC of claim 4 further comprises:
   an advanced high-performance (AHB) bus matrix coupled to the voice and data baseband processing modules.

6. The IC of claim 5 further comprises at least one of:
   a microprocessor core coupled to the AHB bus matrix;
   a direct memory access module coupled to the AHB bus;
   system memory coupled to the direct memory access module;
   a memory controller coupled to the AHB bus.

7. The IC of claim 5 further comprises at least one of:
   a mobile industry processor interface (MIPI) coupled to the AHB bus matrix;
   a universal serial bus (USB) interface coupled to the AHB bus matrix;
   an external memory interface coupled to the AHB bus matrix;
   a secure digital input/output (SDIO) interface coupled to the AHB bus matrix;

an I2S interface coupled to the AHB bus matrix;
a Universal Asynchronous Receiver-Transmitter (UART) interface coupled to the AHB bus matrix;
a Serial Peripheral Interface (SPI) interface coupled to the AHB bus matrix;
a power management interface;
a universal subscriber identity module (USIM) interface coupled to the AHB bus matrix;
a camera interface coupled to the AHB bus matrix; and
a pulse code modulation (PCM) interface coupled to the AHB bus matrix.

8. The Voice-Data-RF IC of claim 5 further comprises at least one of:
a video codec coupled to the AHB bus matrix;
an on-chip microphone coupled to the audio codec; and
an on-chip speaker coupled to the audio codec.

9. An integrated circuit (IC) comprises:
an advanced high-performance (AHB) bus matrix;
a microprocessor core coupled to the AHB bus matrix;
a digital signal processing module coupled to the AHB bus matrix, wherein the digital signal processing module is coupled to:
  convert an outbound voice signal into an outbound voice symbol stream;
  convert an inbound voice symbol stream into an inbound voice signal;
  convert outbound data into an outbound data symbol stream; and
  convert an inbound data symbol stream into inbound data;
a radio frequency (RF) section coupled to:
  convert an inbound RF voice signal into the inbound voice symbol stream;
  convert the outbound voice symbol stream into an outbound RF voice signal;
  convert an inbound RF data signal into the inbound data symbol stream; and
  convert the outbound data symbol stream into an outbound RF data signal; and
an interface module coupled to convey the inbound voice symbol stream and the outbound voice symbol stream between the digital signal processing module and the RF section when the IC is in a voice mode and to convey the inbound data symbol stream and the outbound data symbol stream between the digital signal processing module and the RF section when the IC is in a data mode;
a disk drive interface coupled to the AHB bus matrix and to an off-IC disk drive, wherein the disk driver interface facilitates data transfers between the off-IC disk drive and at least one of the digital signal processor and the microprocessor core;
a data input interface coupled to the AHB bus matrix, wherein the data input interface receives the outbound data; and
a display interface coupled to the AHB bus matrix, wherein the display interface provides the inbound data to an off-IC display.

10. The of claim 9 further comprises at least one of:
a video codec coupled to the AHB bus matrix;
a direct memory access (DMA) coupled to the AHB bus matrix;
an arbitration module coupled to the AHB bus matrix and to a plurality of interface modules, wherein the arbitration module arbitrates access to the AHB bus matrix among the plurality of interface modules;
a graphics engine coupled to the arbitration module, wherein the arbitration module arbitrates access to the AHB bus matrix among the plurality of interface modules and the graphics engine; and
a mobile industry processor interface (MIPI) coupled to the AHB bus matrix.

11. The IC of claim 9 further comprises:
a demultiplexer coupled to the AHB bus matrix and a plurality of modules, wherein the demultiplexer couples one of the plurality of modules to the AHB bus matrix based on a control signal.

12. The IC of claim 11, wherein the plurality of modules comprises at least two of:
a second advanced high-performance (AHB) bus coupled to a second plurality of modules;
a camera interface;
a liquid crystal display interface;
a security engine; and
a security boot read only memory.

13. The IC of claim 12, wherein the second plurality of modules comprises at least two of:
an I2S interface coupled to the AHB bus matrix;
a Universal Asynchronous Receiver-Transmitter (UART) interface coupled to the AHB bus matrix;
a Serial Peripheral Interface (SPI) interface coupled to the AHB bus matrix;
a universal subscriber identity module (USIM) interface coupled to the AHB bus matrix;
real time clock; and
a general purpose input/output (GPIO) interface.

14. A cellular telephone comprises:
a cellular telephone integrated circuit (IC) that includes:
  a baseband processing module coupled to:
    convert an outbound voice signal into an outbound voice symbol stream;
    convert an inbound voice symbol stream into an inbound voice signal;
    convert outbound data into an outbound data symbol stream; and
    convert an inbound data symbol stream into inbound data;
  a disk drive interface coupled to the baseband processing module and to an off-IC disk drive, wherein the disk driver interface facilitates data transfers between the baseband processing module and the off-IC disk drive;
  a radio frequency (RF) section coupled to:
    convert an inbound RF voice signal into the inbound voice symbol stream;
    convert the outbound voice symbol stream into an outbound RF voice signal;
    convert an inbound RF data signal into the inbound data symbol stream; and
    convert the outbound data symbol stream into an outbound RF data signal;
  an interface module coupled to:
    convey the inbound voice symbol stream and the outbound voice symbol stream between the baseband processing module and the RF section; and
    convey the inbound data symbol stream and the outbound data symbol stream between the baseband processing module and the RF section;
an antenna structure coupled to the RF section;
a hard drive coupled to the hard drive interface;
a microphone coupled to the cellular telephone IC;
a speaker coupled to the cellular telephone IC;
a keypad coupled to the cellular telephone IC; and
a display coupled to the cellular telephone IC.

15. The cellular telephone of claim 14, wherein the disk drive interface comprises at least one of:
 a hard disk drive interface to interface with a hard disk drive; and
 a memory card interface to interface with a memory card.

16. The cellular telephone of claim 14, wherein the data transfers between the baseband processing module and the off-IC disk drive comprise at least one of:
 the inbound data;
 the inbound voice signal;
 the outbound voice signal;
 the outbound data;
 a video file;
 a digital music file;
 an image file;
 a text message; and
 a graphics file.

17. The cellular telephone of claim 14, wherein the cellular telephone IC further comprises:
 an audio codec coupled to convert an outbound analog voice signal into the outbound voice signal and to convert the inbound voice signal into an inbound analog voice signal, wherein the outbound analog voice signal is received via the microphone and the inbound analog voice signal is provided to the speaker;
 a display interface coupled to provide the inbound data to the display; and
 a data input interface coupled to receive the outbound data from the keypad and to provide the outbound data to at least one of the data baseband processing module and the display interface.

18. The cellular telephone of claim 17, wherein the cellular telephone IC further comprises:
 an advanced high-performance (AHB) bus matrix coupled to the voice and data baseband processing modules.

19. The cellular telephone of claim 18, wherein the cellular telephone IC further comprises at least one of:
 a microprocessor core coupled to the AHB bus matrix;
 a direct memory access module coupled to the AHB bus;
 system memory coupled to the direct memory access module;
 a memory controller coupled to the AHB bus;
 a mobile industry processor interface (MIPI) coupled to the AHB bus matrix;
 a universal serial bus (USB) interface coupled to the AHB bus matrix;
 an external memory interface coupled to the AHB bus matrix;
 a secure digital input/output (SDIO) interface coupled to the AHB bus matrix;
 an I2S interface coupled to the AHB bus matrix;
 a Universal Asynchronous Receiver-Transmitter (UART) interface coupled to the AHB bus matrix;
 a Serial Peripheral Interface (SPI) interface coupled to the AHB bus matrix;
 a power management interface;
 a universal subscriber identity module (USIM) interface coupled to the AHB bus matrix;
 a camera interface coupled to the AHB bus matrix;
 a pulse code modulation (PCM) interface coupled to the AHB bus matrix; and
 a video codec coupled to the AHB bus matrix.

20. A cellular telephone comprises:
 a cellular telephone integrated circuit (IC) that includes:
  an advanced high-performance (AHB) bus matrix;
  a microprocessor core coupled to the AHB bus matrix;
  a disk drive interface coupled to the baseband processing module and to an off-IC disk drive, wherein the disk driver interface facilitates data transfers between the baseband processing module and the off-IC disk drive;
  a digital signal processing module coupled to the AHB bus matrix, wherein the digital signal processing module is coupled to:
   convert an outbound voice signal into an outbound voice symbol stream;
   convert an inbound voice symbol stream into an inbound voice signal;
   convert outbound data into an outbound data symbol stream; and
   convert an inbound data symbol stream into inbound data;
  a radio frequency (RF) section coupled to:
   convert an inbound RF voice signal into the inbound voice symbol stream;
   convert the outbound voice symbol stream into an outbound RF voice signal;
   convert an inbound RF data signal into the inbound data symbol stream; and
   convert the outbound data symbol stream into an outbound RF data signal; and
  an interface module coupled to convey the inbound voice symbol stream and the outbound voice symbol stream between the digital signal processing module and the RF section when the IC is in a voice mode and to convey the inbound data symbol stream and the outbound data symbol stream between the digital signal processing module and the RF section when the IC is in a data mode;
  a data input interface coupled to the AHB bus matrix, wherein the data input interface receives the outbound data; and
  a display interface coupled to the AHB bus matrix, wherein the display interface provides the inbound data to an off-IC display;
 an antenna structure coupled to the RF section;
 a hard drive coupled to the hard drive interface;
 a microphone coupled to the cellular telephone IC;
 a speaker coupled to the cellular telephone IC;
 a keypad coupled to the data input interface; and
 a display coupled to the display.

21. The cellular telephone of claim 20, wherein the cellular telephone IC further comprises at least one of:
 a video codec coupled to the AHB bus matrix;
 a direct memory access (DMA) coupled to the AHB bus matrix;
 an arbitration module coupled to the AHB bus matrix and to a plurality of interface modules, wherein the arbitration module arbitrates access to the AHB bus matrix among the plurality of interface modules;
 a graphics engine coupled to the arbitration module, wherein the arbitration module arbitrates access to the AHB bus matrix among the plurality of interface modules and the graphics engine; and
 a mobile industry processor interface (MIPI) coupled to the AHB bus matrix.

22. The cellular telephone of claim 20, wherein the cellular telephone IC further comprises:
 a demultiplexer coupled to the AHB bus matrix and a plurality of modules, wherein the demultiplexer couples one of the plurality of modules to the AHB bus matrix based on a control signal.

23. The cellular telephone of claim 22, wherein the plurality of modules comprises at least two of:
- a second advanced high-performance (AHB) bus coupled to a second plurality of modules;
- a camera interface;
- a liquid crystal display interface;
- a security engine; and
- a security boot read only memory.

24. The cellular telephone of claim 23, wherein the second plurality of modules comprises at least two of:
- an I2S interface coupled to the AHB bus matrix;
- a Universal Asynchronous Receiver-Transmitter (UART) interface coupled to the AHB bus matrix;
- a Serial Peripheral Interface (SPI) interface coupled to the AHB bus matrix;
- a universal subscriber identity module (USIM) interface coupled to the AHB bus matrix;
- real time clock; and
- a general purpose input/output (GPIO) interface.

* * * * *